Patented June 12, 1934

1,962,338

UNITED STATES PATENT OFFICE 1,962,338

MOISTUREPROOF MATERIAL AND METHOD OF MAKING SAME

William Hale Charch, Buffalo, N. Y., assignor to Du Pont Cellophane Company, Inc., New York, N. Y., a corporation of Delaware No Drawing. Application January 12, 1932
Serial No. 586,229

81 Claims. (Cl. 91—68)

This application is a continuation-in-part of application Serial No. 303,599, filed September 1, 1928, and relates to moistureproof materials. More particularly, it relates to a moistureproof material in which the moistureproof coating tenaciously adheres or is anchored to the base, and to the method of producing the same.

By the term "moistureproof" is meant the ability of the coated material to resist the transmission or diffusion of moisture or water-vapor therethrough to an extent at least 7 times as great as that displayed by the uncoated base when tested in accordance with the test set forth in the Journal of Industrial and Engineering Chemistry, page 575, vol. 21, No. 6 (June, 1929).

Ordinary sheets or films of regenerated cellulose have been moistureproofed by coating with a moistureproofing composition comprising in its preferred and common species a flowable solution containing a cellulose derivative, a wax and a solvent or solvent mixture, with or without a gum or resin, and optionally a plasticizer. This material is very effective for wrapping products, such as bread, cakes, candy, cigars or the like, which are desired to be maintained in their substantial original fresh condition without any change in the moisture content. When products having an exceedingly large moisture or water content, such as cheese, frozen fish, fresh vegetables, ice cream or the like, are wrapped in this material, the surface coating loosens and/or flakes off, whereby the effectiveness of the material is very appreciably reduced.

I have found that I can eliminate the above-mentioned defect by applying a coating or a layer of a material between the base and the moistureproof surface coating which anchors the latter to the former.

By the expression "anchors" or an equivalent used herein is meant the securing of the moistureproof coating imposed on the base so that the product will withstand the deleterious effect of water or high moisture to a greater degree than the same product in which the intermediate coating is not present.

It is, therefore, an object of this invention to provide a thin, odorless, non-tacky, flexible, moistureproof and preferably transparent material in which the moistureproof coating will not lose its effectiveness, i. e. loosen or flake off, when exposed to water for an appreciable and substantial period of time.

Another object of this invention is to provide a thin, transparent, odorless, non-tacky, flexible moistureproof material wherein the moistureproof coating is anchored to the base.

A specific object of this invention is to provide a thin, transparent, odorless, non-tacky, flexible, moistureproof material admirably suited for wrapping materials containing water or a high moisture content, which is desired to be maintained in its original state comprising a base having a smooth, dense and substantially impermeable surface, a coating of an albuminous substance, such as hydrolyzed gelatin whether hardened or not, or hardened casein, with or without modifying substances, on said base, and a moistureproof coating comprising, for example, a cellulose derivative, a wax, with or without a gum or resin, and optionally a plasticizer disposed on the first-mentioned coating.

Another object of this invention is to provide methods of making the materials set forth in the preceding paragraphs.

Other objects will appear from the following description and appended claims.

Broadly, this invention consists in applying a medium, such as a coating, to a base prior to the application of the moistureproofing coating, said medium firmly adhering to the base and moistureproofing coating and constituting an anchoring medium for the moistureproof coating, whereby the latter does not loosen or flake off said base even when the moistureproofing material is used in conjunction with substances having exceedingly high moisture or water contents for an appreciable and substantial period of time.

As the base, this invention contemplates any material which is smooth, dense, non-porous and quite impermeable to the moistureproofing composition. When such materials are moistureproofed by coating with the selected composition, the latter will not penetrate therethrough and normally result in a surface coating. Sheets or films of regenerated cellulose, chemically treated papers as, for example, papers which have been partially or wholly gelatinized and/or regenerated, highly calendered papers, and glassine paper, may be cited as illustrative examples. In the preferred form of the invention, the base is also transparent.

Numerous materials and compositions may be used for attaining the anchoring effect. The essential prerequisites are that the anchoring coating tenaciously adhere to both the base and the moistureproof coating in the presence of water. Preferably, the anchoring coating should be partially or appreciably soluble in or wetted by the solvent or one of the components thereof used in the moistureproofing composition. When the base is a transparent material and a transparent product is desired, the anchoring coating should also be transparent.

As illustrative examples of specific substances which have given satisfactory anchoring results may be mentioned hydrolyzed gelatin, hardened hydrolyzed gelatin, hardened casein, etc., alone or in combination with each other or suitable modifying ingredients. Resins, for example, gum dammar, shellac and the like, which serve to improve the anchoring effect constitute one exemplification of modifying ingredients.

Hydrolyzed gelatin is well known in the chemical arts as that material which is formed when ordinary gelatin is treated with weak or dilute mineral or organic acids. Hardened casein, though ordinarily insoluble in organic solvents, such as acetone, alcohol, ethyl acetate and mixtures of the same, is sufficiently wetted by them to produce satisfactory results when employed in accordance with the principles of this invention. Hydrolyzed gelatin is sufficiently soluble in and/or wetted by water and the organic solvents previously named as to enable it to be employed in accordance with the principles of this invention.

As the moistureproofing composition, the instant invention contemplates any moistureproofing composition which would normally deposit a non-tenaciously adhering film on the untreated base and which contains one or more substances which wet the anchoring coating and/or unites therewith. A moistureproofing composition comprising a cellulose derivative, a wax and a solvent or solvent mixture, with or without gums or resins, and optionally a plasticizer, are cited as illustrative examples. In the preferred embodiment, the moistureproofing composition comprises a cellulose derivative, a gum or resin, a wax, and a plasticizer of the type specifically set forth in Patent No. 1,826,696.

In carrying out the method constituting one part of this invention, the anchoring coating composition is applied to the base prior to the application of the moistureproof coating. When the anchoring coating is an albuminous material, it may be subsequently hardened. Alternatively, the hardening agent may be incorporated in the albuminous composition. When the composition includes a hardening agent, such as dichromate, which imparts to the coating a yellowish color, the base with the anchcoring coating may be treated so as to substantially eliminate the color. The color may be discharged, for example, by aging the film, treating with light, sunlight or an artificial source of ultra violet light. If the film is aged without light, especially sunlight or ultra violet light, a much longer period of time will be necessary to discharge the yellowish cast than where reduction of the bichromate is carried out in the presence of light or ultra violet light.

When regenerated cellulose sheeting constitutes the base to be moistureproofed, the anchoring medium may be applied in a separate operation to previously-prepared and finished regenerated cellulose sheeting. In the preferred embodiment of the invention, the anchoring coating is applied in an operation combined with the process of casting the regenerated cellulose sheeting to constitute a continuous method. According to this procedure, the anchoring coating composition may be applied to the sheet or film while it is in the gel state, such as in the last bath on the casting machine and before the film enters the drier. Usually, it will be necessary to add a softener for cellulose, such as glycerin, to this bath in order that the regenerated cellulose sheeting may be softened. If the anchoring coating composition is applied in a separate operation to finished regenerated cellulose sheeting containing a softener, it is preferred to use an appropriate softener, such as glycerin, in the bath in order to preserve an appropriate amount of softener in the finished coated film. The softener may also serve the purpose of imparting flexibility to the anchoring coating as well as to the regenerated cellulose sheeting.

Since the coating of regenerated cellulose sheeting presents greater difficulties than the coating of the other bases hereinbefore referred to, several specific embodiments illustrating several procedures of the invention as applied to regenerated cellulose sheeting are hereafter set forth.

*Example I.*—Regenerated cellulose sheeting unwound from a roll is sized or treated in any well-known manner with a solution (aqueous or non-aqueous) of hydrolyzed gelatin. Preferably, the application of the hydrolyzed gelatin is effected by passing the film through a bath of a dilute aqueous solution (1% to 3% concentration of this material) and, after the removal of the excess thereof, setting it, as by passing it over drying rolls.

In order that the dried film might contain the proper percentage of glycerin, the latter may be added to the sizing bath.

When the hydrolyzed gelatin coat is to be hardened, any suitable hardening agent may be incorporated in the sizing bath or, alternatively, the sized material may be treated with a hardening agent.

The sized regenerated cellulose sheeting is then coated with the selected moistureproofing composition. As hereinbefore stated, the solvent of the moistureproofing composition acts to a certain extent on the gelatin size, effecting a partial but not complete solution, whereby a zone of a mixture or solution of the hydrolyzed gelatin and the ingredients of the moistureproofing composition is produced. After the application of the moistureproofing composition, the coated article is subjected to a temperature at least equal to the melting point of the wax in the composition, whereby the solvent is eliminated.

*Example II.*—Instead of applying the size as explained in Example I, it may be applied to the base of regenerated cellulose in an operation combined with the production and manufacture of regenerated cellulose sheeting to constitute a continuous method. According to this procedure, the size may be added to the glycerin bath on the casting machine, and the film of regenerated cellulose, while in the gel state, passed therethrough. The sized film is then dried and hardened as above explained. Finally, the moistureproofing composition is applied and treated as explained in Example I.

*Example III:*

*Solution A.*—To 15 pounds of a good commercial grade of casein, 60 pounds of cold water are added and the mixture heated slowly to 50° C. for ½ hour with agitation. At the end of this period, the temperature is raised to 70° C. and during this interval 2,100 cc. of concentrated ammonia solution is added. The solution is kept at 70° C. with stirring for 1 hour and then the lumps or partially dissolved material are removed, as by filtering through a cloth.

*Solution B.*—340 grams of dry shellac are dissolved in 100 cc. of ethyl alcohol after which there is added thereto 170 cc. of concentrated ammonia (sp. gr. 0.9) diluted to 3 liters.

*Final solution.*—Solution B is added to Solution A slowly with stirring. Subsequently 206 grams of ammonium dichromate dissolved in about 2 liters of water are added, and finally 20 pounds of glycerin are added. To this solution there is added sufficient water to bring the total weight to 300 pounds, and the resulting solution is ready for use.

It is preferable to use this solution freshly prepared.

The regenerated cellulose sheeting or other base, to be treated, is dipped, sprayed or otherwise coated with this solution. After the removal of the excess solution in any suitable manner, the treated film is dried. The thus coated sheet will have a somewhat yellowish cast due to the presence of ammonium dichromate. This color may be discharged by aging the film, treating the film with light, sunlight or by an artificial source of ultra violet light. If the film is aged without light, especially sunlight or ultra violet light, it will take a much longer period of time to discharge the yellow color than where the operation is carried out in combination with strong light or ultra violet light. When the chromate has been reduced, a single sheet is practically colorless and only in multiple layers can a very light greenish cast be observed in the sheet.

Finally, the sized base is coated with any appropriate moistureproofing solution and treated as set forth in Example I.

*Example IV.*—As a modification of the procedure set forth in Example III, the sheet to be coated with casein may be first treated with a 0.5% solution of hydrogen peroxide stabilized with sodium silicate and held at 75°–85° C. After this treatment, the sheet may be passed directly into the casein bath prepared as set forth in Example III. The sized sheet is then moistureproofed as set forth in Example I.

*Example V.*—Same as Example III and/or IV with the exception that the shellac and alcohol are omitted from the formula.

*Example VI.*—Same as Example III except that "a dispersion of gum dammar" is substituted for "the shellac".

*Example VII.*—65 parts of rennet casein and 175 parts of glacial acetic acid are mixed and then heated to 60° C. for 1 hour. There is then added 560 parts of water, heated to 70° C. and the resulting mass mixed in a ball mill for a time (approximately 12 hours) sufficient to produce a suitable emulsion. This emulsion is diluted to a concentration as desired, for example between 3% and 6%, by means of acetic acid and water and formaldehyde, so that the final solution contains about 1.2% formaldehyde. Glycerin is then added to give about a 5% solution of this compound in the final bath.

Regenerated cellulose sheeting is coated in any manner with this solution, the excess removed and the sheet dried. This process produces no color in the finished sheet. The sized sheet is then coated with the moistureproofing solution as explained in Example I.

*Example VIII.*—Same as Example VII but omit "formaldehyde" from the sizing formula.

According to this procedure, after the sheet is coated and dried, it is exposed to the vapors of formaldehyde for a time sufficient to harden the coating, after which the coated material is moistureproofed as previously described.

The product constituting one part of this invention comprises a base which is characterized by a smooth, dense and quite impermeable surface coated with a moistureproofing composition which is anchored to the base by means of a coating disposed intermediate the base and surface material. When the base consists of a transparent material, the final product is also transparent. Due to the fact that the solvent employed in the moistureproofing composition wets or partially dissolves the anchoring coating, the two will mix and form a zone or stratum between the anchoring coating and the moistureproof coating which consists of a combination of the ingredients or both anchoring coating and the moistureproof coating.

Regenerated cellulose sheeting, moistureproofed in accordance with this invention, retains all of the desirable characteristics. Its flexibility, transparency and non-tackiness are in no way impaired and its thickness on the material increases. When the product of this invention is employed as a wrapper for materials having an exceedingly large moisture content, it will be found that the moisture does not deleteriously affect the coating as by loosening or causing it to flake off after a substantial period of time. In all cases the product exhibits a tendency to withstand the action of water to a greater degree than a material in which the anchoring medium is omitted.

The product withstands the deleterious effect of water or high moisture for a period of time at least 5 or more times, such as 10, 20, 50, 100, or even more times, greater than a similar product without the anchoring coating. This property can be quickly shown by comparing the times necessary to loosen the surface coatings sufficiently to be rubbed off when the comparative materials are suspended in water at room temperature.

Since it is obvious that various changes may be made in the above description without departing from the nature or spirit thereof, this invention is not restricted thereto except as set forth in the appended claims.

I claim:

1. An article of manufacture capable of withstanding the deleterious action of water or high moisture for an appreciable period of time comprising a sheet or film of a cellulosic material having a smooth, dense and non-porous surface, a moistureproof surface coating thereon and a water-resisting coating disposed between said sheet or film and moistureproof coating to anchor said moistureproof coating to said sheet or film.

2. An article of manufacture capable of withstanding the deleterious action of water or high moisture for an appreciable period of time comprising a sheet or film of a cellulosic material having a smooth, dense and non-porous surface, a moistureproof surface coating comprising a cellulose derivative and a wax thereon and a water-resisting coating disposed between said sheet or film and moisture-proof coating to anchor said moisture coating to said sheet or film.

3. An article of manufacture capable of withstanding the deleterious action of water or high moisture for an appreciable period of time comprising a sheet or film of a cellulosic material having a smooth, dense and non-porous surface, a moistureproof surface coating comprising a cellulose derivative, a gum, a wax and a plasticizer thereon and a water-resisting coating disposed between said sheet or film and moistureproof coating to anchor said moistureproof coating to said sheet or film.

4. An article of manufacture capable of withstanding the deleterious action of water or high moisture for an appreciable period of time, comprising a sheet or film of a cellulosic material having a smooth, dense and non-porous surface, a moistureproof surface coating thereon and a water-resisting coating comprising a hardened albuminous substance disposed between said sheet or film and moistureproof coating to anchor said moistureproof coating to said sheet or film.

5. An article of manufacture capable of withstanding the deleterious action of water or high moisture for an appreciable period of time comprising a sheet or film of cellulosic material having a smooth, dense and non-porous surface, a moistureproof surface coating comprising a cellulose derivative and a wax thereon and a water-resisting coating comprising a hardened albuminous substance disposed between said sheet or film and moistureproof coating to anchor said moistureproof coating to said sheet or film.

6. An article of manufacture capable of withstanding the deleterious action of water or high moisture for an appreciable period of time comprising a sheet or film of a cellulosic material having a smooth, dense and non-porous surface, a moistureproof surface coating comprising a cellulose derivative, a gum, a wax and a plasticizer thereon and a water-resisting coating comprising a hardened albuminous substance disposed between said sheet or film and moistureproof coating to anchor said moistureproof coating to said sheet or film.

7. An article of manufacture capable of withstanding the deleterious action of water or high moisture for an appreciable period of time comprising a sheet or film of regenerated cellulose having a moistureproof surface coating and a water-resisting coating disposed between said sheet or film and moistureproof coating to anchor said moistureproof coating to said sheet or film.

8. An article of manufacture capable of withstanding the deleterious action of water or high moisture for an appreciable period of time comprising a sheet or film of regenerated cellulose having a moistureproof surface coating comprising a cellulose derivative and a wax and a water-resisting coating disposed between said sheet or film and moistureproof coating to anchor said moistureproof coating to said sheet or film.

9. An article of manufacture capable of withstanding the deleterious action of water or high moisture for an appreciable period of time comprising a sheet or film of regenerated cellulose having a moistureproof surface coating comprising a cellulose derivative, a gum, a wax and a plasticizer and a water-resisting coating disposed between said sheet or film and moistureproof coating to anchor said moistureproof coating to said sheet or film.

10. An article of manufacture capable of withstanding the deleterious action of water or high moisture for an appreciable period of time comprising a sheet or film of regenerated cellulose having a moistureproof surface coating and a coating comprising a hardened albuminous substance disposed between said sheet or film and moistureproof coating to anchor said moistureproof coating to said sheet or film.

11. An article of manufacture capable of withstanding the deleterious action of water or high moisture for an appreciable period of time comprising a sheet or film of regenerated cellulose having a moistureproof surface coating comprising a cellulose derivative and a wax and a coating comprising a hardened albuminous substance disposed between said sheet or film and moistureproof coating to anchor said moistureproof coating to said sheet or film.

12. An article of manufacture capable of withstanding the deleterious action of water or high moisture for an appreciable period of time comprising a sheet or film of regenerated cellulose having a moistureproof surface coating comprising a cellulose derivative, a gum, a wax and a plasticizer and a coating comprising a hardened albuminous substance disposed between said sheet or film and moistureproof coating to anchor said moistureproof coating to said sheet or film.

13. An article of manufacture capable of withstanding the deleterious action of water or high moisture for an appreciable period of time comprising a sheet or film of regenerated cellulose having a moistureproof surface coating and a coating comprising a hardened albuminous substance and a resin disposed between said sheet or film and moistureproof coating to anchor said moistureproof coating to said sheet or film.

14. An article of manufacture capable of withstanding the deleterious action of water or high moisture for an appreciable period of time comprising a sheet or film of regenerated cellulose having a moistureproof surface coating comprising a cellulose derivative and a wax and a coating comprising a hardened albuminous substance and a resin disposed between said sheet or film and moistureproof coating to anchor said moistureproof coating to said sheet or film.

15. An article of manufacture capable of withstanding the deleterious action of water or high moisture for an appreciable period of time comprising a sheet or film of regenerated cellulose having a moistureproof surface coating comprising a cellulose derivative, a gum, a wax and a plasticizer and a coating comprising a hardened albuminous substance and a resin disposed between said sheet or film and moistureproof coating to anchor said moistureproof coating to said sheet or film.

16. An article of manufacture capable of withstanding the deleterious action of water or high moisture for an appreciable period of time comprising a sheet or film of regenerated cellulose having a moistureproof surface coating and a coating comprising a hardened albuminous substance and a softener disposed between said sheet or film and moistureproof coating to anchor said moistureproof coating to said sheet or film.

17. An article of manufacture capable of withstanding the deleterious action of water or high moisture for an appreciable period of time comprising a sheet or film of regenerated cellulose having a moistureproof surface coating comprising a cellulose derivative and a wax and a coating comprising a hardened albuminous substance and a softener disposed between said sheet or film and moistureproof coating to anchor said moistureproof coating to said sheet or film.

18. An article of manufacture capable of withstanding the deleterious action of water or high moisture for an appreciable period of time comprising a sheet or film of regenerated cellulose having a moistureproof surface coating comprising a cellulose derivative, a gum, a wax and a plasticizer and a coating comprising a hardened albuminous substance and a softener disposed between said sheet or film and moistureproof coating to anchor said moistureproof coating to said sheet or film.

19. An article of manufacture capable of withstanding the deleterious action of water or high moisture for an appreciable period of time comprising a sheet or film of regenerated cellulose having a moistureproof surface coating and a coating comprising hydrolyzed gelatin disposed between said sheet or film and moistureproof coating to anchor said moistureproof coating to said sheet or film.

20. An article of manufacture capable of withstanding the deleterious action of water or high moisture for an appreciable period of time comprising a sheet or film of regenerated cellulose having a moistureproof surface coating comprising a cellulose derivative and a wax and a coating comprising hydrolyzed gelatin disposed between said sheet or film and moistureproof coating to anchor said moistureproof coating to said sheet or film.

21. An article of manufacture capable of withstanding the deleterious action of water or high moisture for an appreciable period of time comprising a sheet or film of regenerated cellulose having a moistureproof surface coating comprising a cellulose derivative, a gum, a wax and a plasticizer and a coating comprising hydrolyzed gelatin disposed between said sheet or film and moistureproof coating to anchor said moistureproof coating to said sheet or film.

22. An article of manufacture capable of withstanding the deleterious action of water or high moisture for an appreciable period of time comprising a sheet or film of regenerated cellulose having a moistureproof surface coating and a coating comprising hardened hydrolyzed gelatin disposed between said sheet or film and moistureproof coating to anchor said moistureproof coating to said sheet or film.

23. An article of manufacture capable of withstanding the deleterious action of water or high moisture for an appreciable period of time comprising a sheet or film of regenerated cellulose having a moistureproof surface coating comprising a cellulose derivative and a wax and a coating comprising hardened hydrolyzed gelatin disposed between said sheet or film and moisture proof coating to anchor said moistureproof coating to said sheet or film.

24. An article of manufacture capable of withstanding the deleterious action of water or high moisture for an appreciable period of time comprising a sheet or film of regenerated cellulose having a moistureproof surface coating comprising a cellulose derivative, a gum, a wax and a plasticizer and a coating comprising hardened hydrolyzed gelatin disposed between said sheet or film and moistureproof coating to anchor said moistureproof coating to said sheet or film.

25. An article of manufacture capable of withstanding the deleterious action of water or high moisture for an appreciable period of time comprising a sheet or film of regenerated cellulose having a moistureproof surface coating and a coating comprising hardened casein disposed between said sheet or film and moistureproof coating to anchor said moistureproof coating to said sheet or film.

26. An article of manufacture capable of withstanding the deleterious action of water or high moisture for an appreciable period of time comprising a sheet or film of regenerated cellulose having a moistureproof surface coating comprising a cellulose derivative and a wax and a coating comprising hardened casein disposed between said sheet or film and moistureproof coating to anchor said moistureproof coating to said sheet or film.

27. An article of manufacture capable of withstanding the deleterious action of water or high moisture for an appreciable period of time comprising a sheet or film of regenerated cellulose having a moistureproof surface coating comprising a cellulose derivative, a gum, a wax and a plasticizer and a coating comprising hardened casein disposed between said sheet or film and moistureproof coating to anchor said moistureproof coating to said sheet or film.

28. In a method of moistureproofing, the steps which comprise coating a sheet or film having a smooth, dense and non-porous surface with a water-resisting composition which firmly adheres thereto and then applying a moistureproofing composition containing a substance which wets the first coating, whereby the moistureproof coating is anchored.

29. In a method of moistureproofing, the steps which comprise coating a sheet or film having a smooth, dense and non-porous surface with a water-resisting composition which firmly adheres thereto and then applying a moistureproofing composition containing a cellulose derivative, a wax and a substance which wets the first coating, whereby the moistureproof coating is anchored.

30. In a method of moistureproofing, the steps which comprise coating a sheet or film having a smooth, dense and non-porous surface with a water-resisting composition which firmly adheres thereto and then applying a moistureproofing composition containing a cellulose derivative, a gum, a wax, a plasticizer and a substance which wets the first coating, whereby the moistureproof coating is anchored.

31. In a method of moistureproofing, the steps which comprise coating a sheet or film having a smooth, dense and non-porous surface with a composition comprising an albuminous substance which firmly adheres thereto and then applying a moistureproofing composition containing a substance which wets the first coating, whereby the moistureproof coating is anchored.

32. In a method of moistureproofing, the steps which comprise coating a sheet or film having a smooth, dense and non-porous surface with a composition comprising an albuminous substance which firmly adheres thereto and then applying a moistureproofing composition containing a cellulose derivative, a wax and a substance which wets the first coating, whereby the moistureproof coating is anchored.

33. In a method of moistureproofing, the steps which comprise coating a sheet or film having a smooth, dense and non-porous surface with a composition comprising an albuminous substance which firmly adheres thereto and then applying a moistureproofing composition containing a cellulose derivative, a gum, a wax, a plasticizer and a substance which wets the first coating, whereby the moistureproof coating is anchored.

34. In a method of moistureproofing, the steps which comprise applying to a sheet or film of regenerated cellulose a water-resisting coating which firmly adheres thereto and then applying a moistureproofing composition containing a substance which wets the first coating, whereby the moistureproof coating is anchored.

35. In a method of moistureproofing, the steps which comprise applying to a sheet or film of regenerated cellulose a water-resisting coating 36. In a method of moistureproofing, the steps which comprise applying to a sheet or film of regenerated cellulose a water-resisting coating which firmly adheres thereto and then applying a moistureproofing composition containing a cellulose derivative, a wax and a substance which wets the first coating, whereby the moistureproof coating is anchored.

36. In a method of moistureproofing, the steps which comprise applying to a sheet or film of regenerated cellulose a water-resisting coating which firmly adheres thereto and then applying a moistureproofing composition containing a cellulose derivative, a gum, a wax, a plasticizer and a substance which wets the first coating, whereby the moistureproof coating is anchored.

37. In a method of moistureproofing, the steps which comprise applying to a sheet or film of regenerated cellulose a coating comprising a hardened albuminous substance which firmly adheres thereto and then applying a moistureproofing composition containing a substance which wets the first coating, whereby the moistureproof coating is anchored.

38. In a method of moistureproofing, the steps which comprise applying to a sheet or film of regenerated cellulose a coating comprising a hardened albuminous substance which firmly adheres thereto and then applying a moistureproofing composition containing a cellulose derivative, a wax and a substance which wets the first coating, whereby the moistureproof coating is anchored.

39. In a method of moistureproofing, the steps which comprise applying to a sheet or film of regenerated cellulose a coating comprising a hardened albuminous substance which firmly adheres thereto and then applying a moistureproofing composition containing a cellulose derivative, a gum, a wax, a plasticizer and a substance which wets the first coating, whereby the moistureproof coating is anchored.

40. In a method of moistureproofing, the steps which comprise applying to a sheet or film of regenerated cellulose a coating comprising a hardened albuminous substance and a resin which firmly adheres thereto and then applying a moistureproofing composition containing a substance which wets the first coating, whereby the moistureproof coating is anchored.

41. In a method of moistureproofing, the steps which comprise applying to a sheet or film of regenerated cellulose a coating comprising a hardened albuminous substance and a resin which firmly adheres thereto and then applying a moistureproofing composition containing a cellulose derivative, a wax and a substance which wets the first coating, whereby the moistureproof coating is anchored.

42. In a method of moistureproofing, the steps which comprise applying to a sheet or film of regenerated cellulose a coating comprising a hardened albuminous substance and a resin which firmly adheres thereto and then applying a moistureproofing composition containing a cellulose derivative, a gum, a wax, a plasticizer and a substance which wets the first coating, whereby the moistureproof coating is anchored.

43. In a method of moistureproofing, the steps which comprise applying to a sheet or film of regenerated cellulose a coating comprising a hardened albuminous substance and a softener which firmly adheres thereto and then applying a moistureproofing composition containing a substance which wets the first coating, whereby the moistureproof coating is anchored.

44. In a method of moistureproofing, the steps which comprise applying to a sheet or film of regenerated cellulose a coating comprising a hardened albuminous substance and a softener which firmly adheres thereto and then applying a moistureproofing composition containing a cellulose derivative, a wax and a substance which wets the first coating, whereby the moistureproof coating is anchored.

45. In a method of moistureproofing, the steps which comprise applying to a sheet or film of regenerated cellulose a coating comprising a hardened albuminous substance and a softener which firmly adheres thereto and then applying a moistureproofing composition containing a cellulose derivative, a gum, a wax, a plasticizer and a substance which wets the first coating, whereby the moistureproof coating is anchored.

46. In a method of moistureproofing, the steps which comprise applying to a sheet or film of regenerated cellulose a coating comprising hydrolyzed gelatin which firmly adheres thereto and then applying a moistureproofing composition containing a substance which wets the first coating, whereby the moistureproof coating is anchored.

47. In a method of moistureproofing, the steps which comprise applying to a sheet or film of regenerated cellulose a coating comprising hydrolyzed gelatin which firmly adheres thereto and then applying a moistureproofing composition containing a cellulose derivative, a wax and a substance which wets the first coating, whereby the moistureproof coating is anchored.

48. In a method of moistureproofing, the steps which comprise applying to a sheet or film of regenerated cellulose a coating comprising hydrolyzed gelatin which firmly adheres thereto and then applying a moistureproofing composition containing a cellulose derivative, a gum, a wax, a plasticizer and a substance which wets the first coating, whereby the moistureproof coating is anchored.

49. In a method of moistureproofing, the steps which comprise applying to a sheet or film of regenerated cellulose a coating comprising hardened hydrolized gelatin which firmly adheres thereto and then applying a moistureproofing composition containing a substance which wets the first coating, whereby the moistureproof coating is anchored.

50. In a method of moistureproofing, the steps which comprise applying to a sheet or film of regenerated cellulose a coating comprising hardened hydrolyzed gelatin which firmly adheres thereto and then applying a moistureproofing composition containing a cellulose derivative, a wax and a substance which wets the first coating, whereby the moistureproof coating is anchored.

51. In a method of moistureproofing, the steps which comprise applying to a sheet or film of regenerated cellulose a coating comprising hardened hydrolyzed gelatin which firmly adheres thereto and then applying a moistureproofing composition containing a cellulose derivative, a gum, a wax, a plasticizer and a substance which wets the first coating, whereby the moistureproof coating is anchored.

52. In a method of moistureproofing, the steps which comprise applying to a sheet or film of regenerated cellulose a coating comprising hardened casein which firmly adheres thereto and then applying a moistureproofing composition containing a substance which wets the first coating, whereby the moistureproof coating is anchored.

53. In a method of moistureproofing, the steps which comprise applying to a sheet or film of regenerated cellulose a coating comprising hardened casein which firmly adheres thereto and then applying a moistureproofing composition containing a cellulose derivative, a wax and a substance which wets the first coating, whereby the moistureproof coating is anchored.

54. In a method of moistureproofing, the steps which comprise applying to a sheet or film of regenerated cellulose a coating comprising hardened casein which firmly adheres thereto and then applying a moistureproofing composition containing a cellulose derivative, a gum, a wax, a plasticizer and a substance which wets the first coating, whereby the moistureproof coating is anchored.

55. In combination with the process of preparing sheets or films of regenerated cellulose, the steps which comprise treating the gel film with a composition which when set is water-resistant and firmly adheres thereto, drying the treated film, and then applying a moistureproofing composition containing a solvent which wets the first-named composition.

56. In combination with the process of preparing sheets or films of regenerated cellulose, the steps which comprise treating the gel film with a composition which when set is water-resistant and firmly adheres thereto, drying the treated film, and then applying a moistureproofing composition comprising a cellulose derivative, a wax and a solvent which wets the first-named composition.

57. In combination with the process of preparing sheets or films of regenerated cellulose, the steps which comprise treating the gel film with a composition which when set is water-resistant and firmly adheres thereto, drying the treated film, and then applying a moistureproofing composition comprising a cellulose derivative, a gum, a wax, a plasticizer and a solvent which wets the first-named composition.

58. In combination with the process of preparing sheets or films of regenerated cellulose, the steps which comprise treating the gel film with a composition comprising an albuminous substance, drying the film, hardening the albuminous substance, and then applying a moistureproofing composition containing a solvent which wets the albuminous composition.

59. In combination with the process of preparing sheets or films of regenerated cellulose, the steps which comprise treating the gel film with a composition comprising an albuminous substance, drying the film, hardening the albuminous substance, and then applying a moistureproofing composition comprising a cellulose derivative, a wax and a solvent which wets the albuminous composition.

60. In combination with the process of preparing sheets or films of regenerated cellulose, the steps which comprise treating the gel film with a composition comprising an albuminous substance, drying the film, hardening the albuminous substance, and then applying a moistureproofing composition comprising a cellulose derivative, a gum, a wax, a plasticizer and a solvent which wets the albuminous composition.

61. In combination with the process of preparing sheets or films of regenerated cellulose, the steps which comprise treating the gel film with a composition comprising an albuminous substance and a resin, drying the film, hardening the albuminous substance, and then applying a moistureproofing composition containing a solvent which wets the albuminous composition.

62. In combination with the process of preparing sheets or films of regenerated cellulose, the steps which comprise treating the gel film with a composition comprising an albuminous substance and a resin, drying the film, hardening the albuminous substance, and then applying a moistureproofing composition comprising a cellulose derivative, a wax and a solvent which wets the albuminous composition.

63. In combination with the process of preparing sheets or films of regenerated cellulose, the steps which comprise treating the gel film with a composition comprising an albuminous substance and a resin, drying the film, hardening the albuminous substance, and then applying a moistureproofing composition comprising a cellulose derivative, a gum, a wax, a plasticizer and a solvent which wets the albuminous composition.

64. In combination with the process of preparing sheets or films of regenerated cellulose, the steps which comprise treating the gel film with a composition comprising an albuminous substance and a softener, drying the film, hardening the albuminous substance, and then applying a moistureproofing composition containing a solvent which wets the albuminous composition.

65. In combination with the process of preparing sheets or films of regenerated cellulose, the steps which comprise treating the gel film with a composition comprising an albuminous substance and a softener, drying the film, hardening the albuminous substance, and then applying a moistureproofing composition comprising a cellulose derivative, a wax and a solvent which wets the albuminous composition.

66. In combination with the process of preparing sheets or films of regenerated cellulose, the steps which comprise treating the gel film with a composition comprising an albuminous substance and a softener, drying the film, hardening the albuminous substance, and then applying a moistureproofing composition comprising a cellulose derivative, a gum, a wax, a plasticizer and a solvent which wets the albuminous composition.

67. In combination with the process of preparing sheets or films of regenerated cellulose, the steps which comprise treating the gel film with a composition comprising hydrolyzed gelatin, drying the film, hardening the hydrolyzed gelatin, and then applying a moistureproofing composition containing a solvent which wets the gelatin.

68. In combination with the process of preparing sheets or films of regenerated cellulose, the steps which comprise treating the gel film with a composition comprising hydrolyzed gelatin, drying the film, hardening the hydrolyzed gelatin, and then applying a moistureproofing composition comprising a cellulose derivative, a wax and a solvent which wets the gelatin.

69. In combination with the process of preparing sheets or films of regenerated cellulose, the steps which comprise treating the gel film with a composition comprising hydrolyzed gelatin, drying the film, hardening the hydrolyzed gelatin, and then applying a moistureproofing composition comprising a cellulose derivative, a gum, a wax, a plasticizer and a solvent which wets the gelatin.

70. In combination with the process of preparing sheets or films of regenerated cellulose, the steps which comprise treating the gel film with a composition comprising hydrolyzed gelatin, drying the film, and then applying a moistureproofing composition containing a solvent which wets the gelatin.

71. In combination with the process of preparing sheets or films of regenerated cellulose, the steps which comprise treating the gel film with a composition comprising hydrolyzed gelatin, drying the film, and then applying a moistureproofing composition comprising a cellulose derivative, a wax and a solvent which wets the gelatin.

72. In combination with the process of preparing sheets or films of regenerated cellulose, the steps which comprise treating the gel film with a composition comprising hydrolyzed gelatin, drying the film, and then applying a moistureproofing composition comprising a cellulose derivative, a gum, a wax, a plasticizer and a solvent which wets the gelatin.

73. In combination with the process of preparing sheets or films of regenerated cellulose, the steps which comprise treating the gel film with a composition comprising casein, drying the film, hardening the casein, and then applying a moistureproofing composition containing a solvent which wets the casein.

74. In combination with the processs of preparing sheets or films of regenerated cellulose, the steps which comprise treating the gel film with a composition comprising casein, drying the film, hardening the casein, and then applying a moistureproofing composition comprising a cellulose derivative, a wax and a solvent which wets the casein.

75. In combination with the process of preparing sheets or films of regenerated cellulose, the steps which comprise treating the gel film with a composition comprising casein, drying the film, hardening the casein, and then applying a moistureproofing composition comprising a cellulose derivative, a gum, a wax, a plasticizer and a solvent which wets the casein.

76. An article of manufacture capable of withstanding the deleterious action of water or high moisture for an appreciable period of time comprising a transparent sheet or film of a cellulosic material having a smooth, dense and non-porous surface, a transparent moistureproof surface coating thereon and a transparent water-resisting coating disposed between said sheet or film and moistureproof coating to anchor said moistureproof coating to said sheet or film.

77. An article of manufacture capable of withstanding the deleterious action of water or high moisture for an appreciable period of time comprising a transparent sheet or film of a cellulosic material having a smooth, dense and non-porous surface, a transparent moistureproof surface coating comprising a cellulose derivative and a wax thereon and a transparent water-resisting coating disposed between said sheet or film and moistureproof coating to anchor said moistureproof coating to said sheet or film.

78. An article of manufacture capable of withstanding the deleterious action of water or high moisture for an appreciable period of time comprising a transparent sheet or film of a cellulosic material having a smooth, dense and non-porous surface, a transparent moistureproof surface coating comprising a cellulose derivative, a gum, a wax and a plasticizer thereon and a transparent water-resisting coating disposed between said sheet or film and moistureproof coating to anchor said moistureproof coating to said sheet or film.

79. An article of manufacture capable of withstanding the deleterious action of water or high moisture for an appreciable period of time comprising a transparent sheet or film of regenerated cellulose having a transparent moistureproof surface coating and a transparent water-resisting coating disposed between said sheet or film and moistureproof coating to anchor said moistureproof coating to said sheet to film.

80. An article of manufacture capable of withstanding the deleterious action of water or high moisture for an appreciable period of time comprising a transparent sheet or film of regenerated celluose having a transparent moistureproof surface coating comprising a cellulose derivative and a wax and a transparent water-resisting coating disposed between said sheet or film and moistureproof coating to anchor said moistureproof coating to said sheet or film.

81. An article of manufacture capable of withstanding the deleterious action of water or high moisture for an appreciable period of time comprising a transparent sheet or film or regenerated cellulose having a transparent moistureproof surface coating comprising a cellulose derivative, a gum, a wax and a plasticizer and a transparent water-resisting coating disposed between said sheet or film and moistureproof coating to anchor said moistureproof coating to said sheet or film.

WILLIAM HALE CHARCH.

CERTIFICATE OF CORRECTION.

Patent No. 1,962,338.  
June 12, 1934.

WILLIAM HALE CHARCH.

It is hereby certified that error appears in the printed specification of the above numbered patent requiring correction as follows: Page 2, line 53, for "anchcoring" read anchoring; and lines 56-57, for "artificiol" read artificial; page 3, line 141, claim 2, for "moisture" read moistureproof; page 4, line 17, claim 5, before "cellulosic" insert the article a; page 6, line 119, claim 49, for "hydrolized" read hydrolyzed; page 8, line 27, claim 74, for "processs" read process: and that the said Letters Patent should be read with these corrections therein that the same may conform to the record of the case in the Patent Office.

Signed and sealed this 24th day of July, A. D. 1934.

Bryan M. Battey composition comprising hydrolyzed gelatin, drying the film, and then applying a moistureproofing composition containing a solvent which wets the gelatin.

71. In combination with the process of preparing sheets or films of regenerated cellulose, the steps which comprise treating the gel film with a composition comprising hydrolyzed gelatin, drying the film, and then applying a moistureproofing composition comprising a cellulose derivative, a wax and a solvent which wets the gelatin.

72. In combination with the process of preparing sheets or films of regenerated cellulose, the steps which comprise treating the gel film with a composition comprising hydrolyzed gelatin, drying the film, and then applying a moistureproofing composition comprising a cellulose derivative, a gum, a wax, a plasticizer and a solvent which wets the gelatin.

73. In combination with the process of preparing sheets or films of regenerated cellulose, the steps which comprise treating the gel film with a composition comprising casein, drying the film, hardening the casein, and then applying a moistureproofing composition containing a solvent which wets the casein.

74. In combination with the processs of preparing sheets or films of regenerated cellulose, the steps which comprise treating the gel film with a composition comprising casein, drying the film, hardening the casein, and then applying a moistureproofing composition comprising a cellulose derivative, a wax and a solvent which wets the casein.

75. In combination with the process of preparing sheets or films of regenerated cellulose, the steps which comprise treating the gel film with a composition comprising casein, drying the film, hardening the casein, and then applying a moistureproofing composition comprising a cellulose derivative, a gum, a wax, a plasticizer and a solvent which wets the casein.

76. An article of manufacture capable of withstanding the deleterious action of water or high moisture for an appreciable period of time comprising a transparent sheet or film of a cellulosic material having a smooth, dense and non-porous surface, a transparent moistureproof surface coating thereon and a transparent water-resisting coating disposed between said sheet or film and moistureproof coating to anchor said moistureproof coating to said sheet or film.

77. An article of manufacture capable of withstanding the deleterious action of water or high moisture for an appreciable period of time comprising a transparent sheet or film of a cellulosic material having a smooth, dense and non-porous surface, a transparent moistureproof surface coating comprising a cellulose derivative and a wax thereon and a transparent water-resisting coating disposed between said sheet or film and moistureproof coating to anchor said moistureproof coating to said sheet or film.

78. An article of manufacture capable of withstanding the deleterious action of water or high moisture for an appreciable period of time comprising a transparent sheet or film of a cellulosic material having a smooth, dense and non-porous surface, a transparent moistureproof surface coating comprising a cellulose derivative, a gum, a wax and a plasticizer thereon and a transparent water-resisting coating disposed between said sheet or film and moistureproof coating to anchor said moistureproof coating to said sheet or film.

79. An article of manufacture capable of withstanding the deleterious action of water or high moisture for an appreciable period of time comprising a transparent sheet or film of regenerated cellulose having a transparent moistureproof surface coating and a transparent water-resisting coating disposed between said sheet or film and moistureproof coating to anchor said moistureproof coating to said sheet to film.

80. An article of manufacture capable of withstanding the deleterious action of water or high moisture for an appreciable period of time comprising a transparent sheet or film of regenerated celluose having a transparent moistureproof surface coating comprising a cellulose derivative and a wax and a transparent water-resisting coating disposed between said sheet or film and moistureproof coating to anchor said moistureproof coating to said sheet or film.

81. An article of manufacture capable of withstanding the deleterious action of water or high moisture for an appreciable period of time comprising a transparent sheet or film or regenerated cellulose having a transparent moistureproof surface coating comprising a cellulose derivative, a gum, a wax and a plasticizer and a transparent water-resisting coating disposed between said sheet or film and moistureproof coating to anchor said moistureproof coating to said sheet or film.

WILLIAM HALE CHARCH.

CERTIFICATE OF CORRECTION.

Patent No. 1,962,338.     June 12, 1934.

WILLIAM HALE CHARCH.

It is hereby certified that error appears in the printed specification of the above numbered patent requiring correction as follows: Page 2, line 53, for "anchcoring" read anchoring; and lines 56-57, for "artificiol" read artificial; page 3, line 141, claim 2, for "moisture" read moistureproof; page 4, line 17, claim 5, before "cellulosic" insert the article a; page 6, line 119, claim 49, for "hydrolized" read hydrolyzed; page 8, line 27, claim 74, for "processs" read process: and that the said Letters Patent should be read with these corrections therein that the same may conform to the record of the case in the Patent Office.

Signed and sealed this 24th day of July, A. D. 1934.

Bryan M. Battey